United States Patent [19]

Clementino

[11] Patent Number: 4,606,080
[45] Date of Patent: Aug. 19, 1986

[54] PORTABLE TOILET

[76] Inventor: Edwin A. Clementino, 116 Sunnyhill Dr., Petaluma, Calif. 94952

[21] Appl. No.: 723,887

[22] Filed: Apr. 16, 1985

[51] Int. Cl.$^4$ .................. A47K 11/02; E04H 1/12
[52] U.S. Cl. ........................................ 4/460; 4/449; 4/452; 138/159; 220/4 B; 220/4 E
[58] Field of Search .................. 4/460, 661, 449, 452, 4/462; 220/4 E, 4 B, 4 F, 18; 138/159

[56] References Cited

U.S. PATENT DOCUMENTS

| | | | |
|---|---|---|---|
| D. 258,409 | 3/1981 | Nattrass | 220/4 E X |
| 3,063,591 | 11/1962 | Laginestra | 220/4 B X |
| 3,064,870 | 11/1962 | Dunlap, Jr. et al. | 138/159 X |
| 3,195,272 | 7/1965 | Mosher et al. | 220/4 B X |
| 3,295,713 | 1/1967 | Optner | 220/4 E X |
| 3,708,085 | 1/1973 | Bumpas | 220/18 |
| 4,187,561 | 2/1980 | Bogan | 4/460 X |

FOREIGN PATENT DOCUMENTS 528453 10/1940 United Kingdom .................. 4/460

Primary Examiner—Henry K. Artis
Attorney, Agent, or Firm—Flehr, Hohbach, Test, Albritton & Herbert

[57] ABSTRACT

A sanitary, portable toilet comprised of a barrel-shaped stool formed of split cylinders which are detachably mounted at their top ends by an annular seat and at their bottom ends by a pair of C-shaped baseplate elements. The elements of the baseplate are detachably mounted together through pin and shackle connections. A flexible disposable liner is suspended within the stool with the upper end of the liner captured between an outer rim at the upper end of the split cylinders and a downwardly extending rim of the seat. A lid is pivotally mounted on the top of the seat.

4 Claims, 4 Drawing Figures

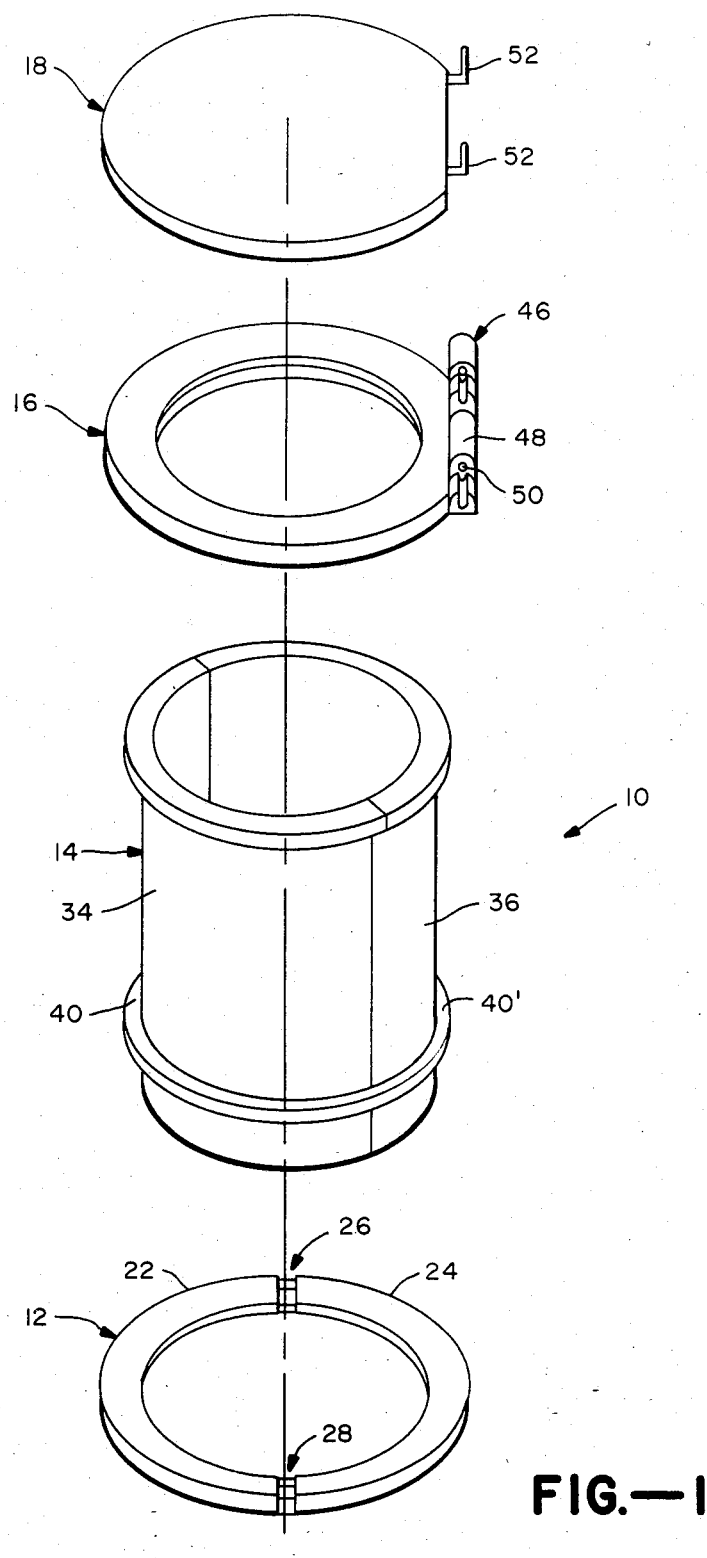
FIG.—1

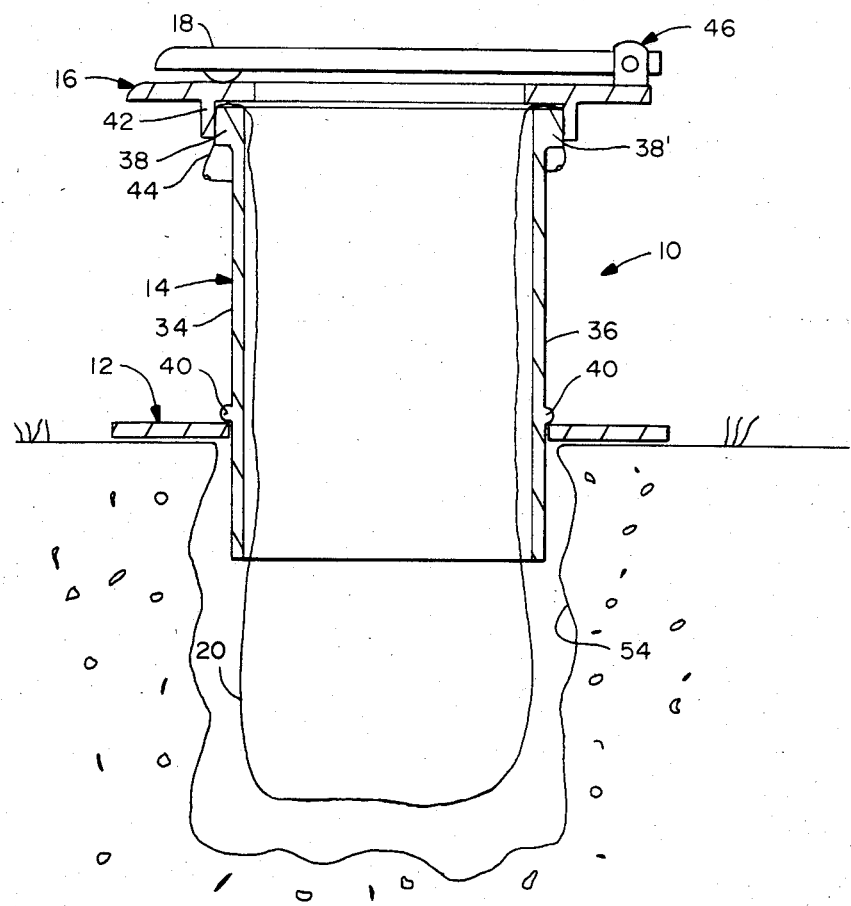
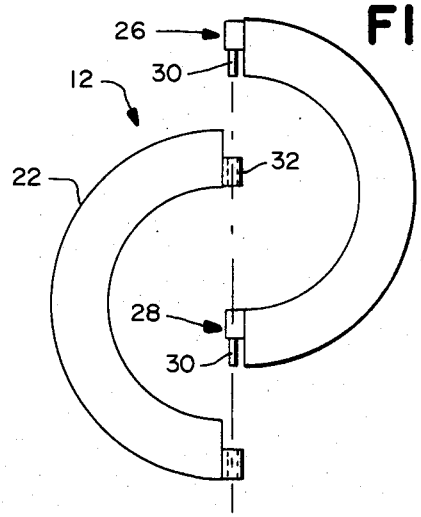
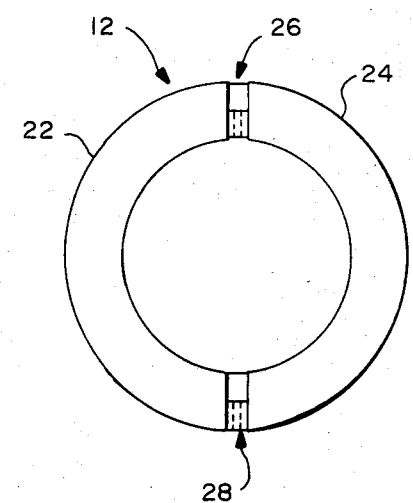
FIG.—2
FIG.—3a
FIG.—3b

PORTABLE TOILET

This invention relates to portable toilets of the type used in the outdoors by campers and laborers.

Different types and designs of portable toilets and latrines have previously been provided. Generally, many of these prior designs are characterized in being relatively bulky and cannot be readily assembled and disassembled for easy transport. These prior portable toilets have principally been designed for relatively long-term installation and are not well adapted for use by campers and others who find it desirable to quickly break up camp and move. Many of the prior portable toilets are also not well suited for transport in the confines of a car or relatively small truck or van of the type used by campers. In addition, many of the prior portable toilets and latrines have the drawback of not being sufficient sanitary after use for transport in a person's car, truck or van.

Accordingly, it is a general object of the present invention to provide a new and improved portable toilet which obviates the disadvantages and drawbacks of previous designs.

Another object is to provide a portable toilet which is adaptable for quick installation for setup at the campsite and can then be readily disassembled and stowed for transport.

Another object is to provide a portable toilet of the type described which can be readily assembled and disassembled in the field without the use of special tools and in which the component elements, after disassembly, can be stored in a relatively small volume for easy transport.

Another object is to provide a portable toilet of the type described which is completely sanitary in that after use the component elements can be stored and transported in uncontaminated condition.

In the invention the portable toilet includes a barrel-shaped stool which is comprised of a pair of longitudinally split cylinders which detachably fit together to form a hollow cylinder. An annular baseplate is detachably fitted about one end of the cylinder and the baseplate is adapted to be mounted about a hole dug in the ground surface. An annular seat is detachably fitted about the opposite end of the stool and a lid is pivotally mounted on top of the seat. A flexible bag-shaped liner is suspended inside of the stool from its top.

The foregoing and additional objects and features of the invention will appear from the following specification in which the preferred embodiment has been set forth in detail in conjunction with the accompanying drawings.

FIG. 1 is an exploded, perspective view of a portable toilet according to a preferred embodiment of the invention.

FIG. 2 is a vertical axial section of the assembled portable toilet of FIG. 1 shown installed over a hole formed in the surface of the ground.

FIG. 3(a) is a top plan view of the baseplate for the toilet of FIG. 1 in which the component elements are shown separated with their pin-locking elements in alignment.

FIG. 3(b) is a top plan view of the baseplate of FIG. 3a showing the component elements locked together.

The drawings illustrate a preferred embodiment comprising the portable toilet 10. Toilet 10 includes an annular baseplate 12, a barrel-shaped stool 14, an annular seat 16, and a lid 18 pivotally mounted at one side of the seat. The toilet also includes a bag-shaped disposable liner 20 for containing waste. Liner 20 preferably is made of a suitable flexible, liquid impervious material such as polyvinylchloride or other synthetic polymer.

Annular baseplate 12 is comprised of a pair of flat, C-shaped elements 22, 24 formed of a strong and rigid material such as metal or hard plastic. The C-shaped elements are detachably mounted at opposite ends by pin and shackle connections 26, 28. Each connection comprises a diametrically extending pin 30 mounted on one of the elements with the pin adapted for sliding into the opening of a shackle 32 mounted on an end of the opposing element. FIG. 3(a) shows the elements in detached relationship and FIG. 3(b) shows the elements locked together. With the elements of the baseplate locked together its inner diameter is sized for close-fitting engagement with the outer diameter of the stool.

Barrel-shaped stool 14 is comprised of a pair of longitudinally split or half-cylinders 34, 36 which when fitted together form a hollow cylinder which is open at its opposite top and bottom ends. The upper end of each split cylinder is formed with an outwardly projecting rim 38, 38'. A circumferential bead 40, 40' is formed about the outer surface of each split cylinder at an axial distance on the order of four inches from the lower end of the cylinder. When the cylinders are fitted together the outer beads abut the inner edge of baseplate 12 to hold and position the stool in an upright orientation extending above ground surface.

Annual seat 16 is formed with a downwardly projecting circular rim 42 which is sized to closely fit about the upper rims of the cylinders which form the stool. The upper end of the split cylinders are thereby captured within the seat rim so as to detachably lock the split cylinders together. The upper end 44 of liner 20 is placed between and securely held by the close fitting engagement between seat rim 42 and the rims 38 of the split cylinders.

Flat toilet lid 18 extends over the opening of the seat and is pivotally mounted at one side by a hinge connection 46. The hinge connection comprises a hinge plate 48 which is preferably molded integrally with one side of the seat and is formed with slots and horizontally extending bores 50. A pair of L-shaped pivot pins 52 are secured to one side of the lid and the distal ends of the pins are adapted to be detachably inserted into the bores of the hinge plate for up and down pivotal movement of the lid.

The use and operation of the invention is as follows:

At the campsite, the separate elements of the invention can be rapidly and easily assembled without the use of special tools. The C-shaped baseplate elements 22 and 24 are assembled together by sliding the hinge pins 30 into the shackles in the manner shown in FIGS. 3(a) and 3(b). The resulting annular baseplate is then mounted over an opening 54 which has been dug in the surface of the ground. The split half-cylinders 34 and 36 are then fitted together with their lower ends inserted through the opening of the baseplate until the outer beads 40 abut the upper surface of the baseplate. The flexible liner 20 is then dropped down into the inside of the stool with the upper end 44 of the liner lapping over the edge of rim 38 in a manner showing in FIG. 2. The seat 16 is then placed over the upper end of the stool so that the rim 42 securely presses down about stool rim 38 to thereby capture and hold the upper end of the liner between the two rims. The lid 18 is then mounted in place by sliding the pivot pins into the bores of the hinge plate. The baseplate and seat thereby capture and detachably secure the respective lower and upper ends of the split cylinders.

Portable toilet 10 can be quickly disassembled by pulling the seat upwardly to release its rim from the stool. This frees the upper end of the liner which can then be dropped into the hole. The two split cylinders are then lifted from the baseplate and separated. The baseplate is then removed and the hole backfilled with earth to bury the liner and contained waste. The disassembled elements of the toilet can then be stored in a relatively compact space of the user's car, truck or van for transport to the next camping site. As a result of isolation of the waste in the liner, the disassembled elements can be safely transported free of contamination and without any requirement for special cleansing.

While the foregoing embodiment is at present considered to be preferred, it is understood that numerous variations and modifications can be made therein by those skilled in the art and it is intended to cover in the appended claims all such variations and modifications as fall within the true spirit and scope of the invention.

What is claimed is:

1. A sanitary, portable toilet adapted for rapid and easy assembly, disassembly and transport, including the combination of a barrel-shaped stool comprised of a hollow cylinder opened at opposite top and bottom ends, the cylinder being comprised of a pair of longitudinally split half-cylinders, an annular baseplate having an inner diameter commensurate with the outer diameter of the cylinder and detachably fitted about the bottom end thereof, said baseplate adapted for placement about a hole formed in the surface of the ground; an annular seat detachably fitted about the top end of the stool; a lid pivotally mounted on the seat; said half-cylinders being detachably captured together by the baseplate and seat; means forming an outwardly extending bead about the outer surface of each half-cylinder at a pre-determined location from the lower end of the stool with the beads abutting the inner circumference of the baseplate when in assembled relationship therewith.

2. A toilet as in claim 1 in which the seat is formed with a downwardly extending annular rim having an inner diameter commensurate with the outer diameter of the upper end of the stool whereby the rim of the seat detachably fits about and captures together the abutting upper ends of the split half-cylinders.

3. A toilet as in claim 2 which includes a flexible bag-shaped disposable liner suspended inside the stool from its top with the upper end of the liner detachably captured between the rim of the stool and the upper ends of the split half-cylinders.

4. A toilet as in claim 3 in which the upper ends of the split half-cylinders are each formed with an outwardly extending rim which when joined together have an outer diameter commensurate with the inner diameter of the seat rim.

* * * * *